United States Patent [19]

Kikuchi et al.

[11] 4,404,568

[45] Sep. 13, 1983

[54] PRINTER

[75] Inventors: Yoshiki Kikuchi; Takashi Ohmori, both of Kanagawa, Japan

[73] Assignee: Fuji Xerox Co., Ltd., Kanagawa, Japan

[21] Appl. No.: 312,023

[22] Filed: Oct. 16, 1981

[30] Foreign Application Priority Data

Dec. 19, 1980 [JP] Japan ................................ 55-178918

[51] Int. Cl.$^{3}$ ...................... G01D 15/10; G01D 15/24; G03G 15/00

[52] U.S. Cl. ............................ 346/76 PH; 346/135.1; 355/14 SH

[58] Field of Search ........................ 346/76 PH, 135.1; 355/14 SH

[56] References Cited

U.S. PATENT DOCUMENTS

| | | | |
|---|---|---|---|
| 4,170,422 | 10/1979 | Bilek | 346/76 PH X |
| 4,195,937 | 4/1980 | Baran | 346/76 PH X |
| 4,310,236 | 1/1982 | Connin | 355/14 SH |
| 4,341,462 | 7/1982 | Ogura | 355/14 SH |
| 4,359,748 | 11/1982 | Pasini et al. | 346/76 PH |

*Primary Examiner*—George H. Miller, Jr.
*Attorney, Agent, or Firm*—Sughrue, Mion, Zinn, Macpeak and Seas

[57] ABSTRACT

A thermosensitive copying machine can selectively use either manually or automatically supplied paper, has a pivotable roller and brake mechanism for minimizing wrinkles in the ink donor sheet, supplies the copy paper and donor sheet over paths which differ except at the recording station, and has a separating guide member for peeling the copied paper away from the donor sheet. The donor sheet transport mechanism is enabled only when necessary for a recording operation.

6 Claims, 2 Drawing Figures

PRINTER

RELATED APPLICATIONS

This application is related to copending and concurrently filed applications Ser. Nos. 312,020, 312,025, 312,021, 312,022, and 312,024, filed on Oct. 16, 1981 corresponding respectively to Japanese patent applications 55-144419 filed in Japan on Oct. 17, 1980, 55-160797 filed in Japan on Nov. 17, 1980, 55-170290 filed in Japan on Dec. 4, 1980, 55-170291 filed in Japan on Dec. 4, 1980, and 55-174077 filed in Japan on Dec. 10, 1980 all of which are commonly assigned with this application.

BACKGROUND OF THE INVENTION

This invention relates to a heat-sensible type printer operated by a non-impact means for obtaining hard copies.

The non-impact printer is of a low-noise type, and has advantageous features of recording at high speed and printing letters of any size. In color-recording, non-impact printers, particularly in the heat-sensitive type printers wherein printing is carried out by applying heat, printers using heat-sensitive paper wherein a heat-sensing agent is applied on the base paper are widely used. However, a problem has arisen that when the heat-sensitive paper used in this printer is irradiated by sunlight, etc., the recorded image is faded.

In order to resolve this difficulty, a printer using a heat-sensitive ink sheet has been developed. A heat-sensitive ink sheet is a sheet obtained by overlapping or "sandwiching" a recording paper with a heat-sensitive paper applied with a heat-melting solid ink on one surface thereof in such a manner that the solid ink comes into contact with the recording paper. In this printer, the base paper side of the heat-sensitive ink sheet is heated by a thermal head to melt a portion of the solid ink whereby a heat-transfer recording is effected onto the ordinary recording paper.

However, in the printer of this type, there were disadvantages that it was necessary to peel of the recording paper from the heat-sensitive ink sheet by hand after completion of the recording, and further, if the heat-sensitive ink sheet was left carelessly in a place of high temperature, ink was transferred to the recording paper at a stage prior to the recording.

SUMMARY OF THE INVENTION

The present invention was developed in consideration of above-mentioned difficulties, and an object of the invention is to provide a printer which can feed the heat recording medium and the recording paper separately. It is a further object of this invention to provide such a printer wherein the recording paper, after the recording operation, can be obtained in a peeled-off form from the heat recording medium.

According to this invention, independent travelling mechanisms are provided for each of the heat recording medium and the recording paper in the printer, and the position of the ordinary paper used as the recording paper is detected by a sensor disposed in front of a thermal head, so as to control the operations of both travelling mechanisms.

Further, the heat recording medium is made to change its path abruptly at a location after the recording operation occurs, thus making it difficult for the recording paper to follow, and a guide member is disposed close to the heat recording medium to engage the leading edge of the recording paper and separate it.

BRIEF DESCRIPTION OF THE DRAWINGS

The present invention will now be described referring to the accompanying drawings, in which.

DETAILED DESCRIPTION OF THE INVENTION

Figure 1:
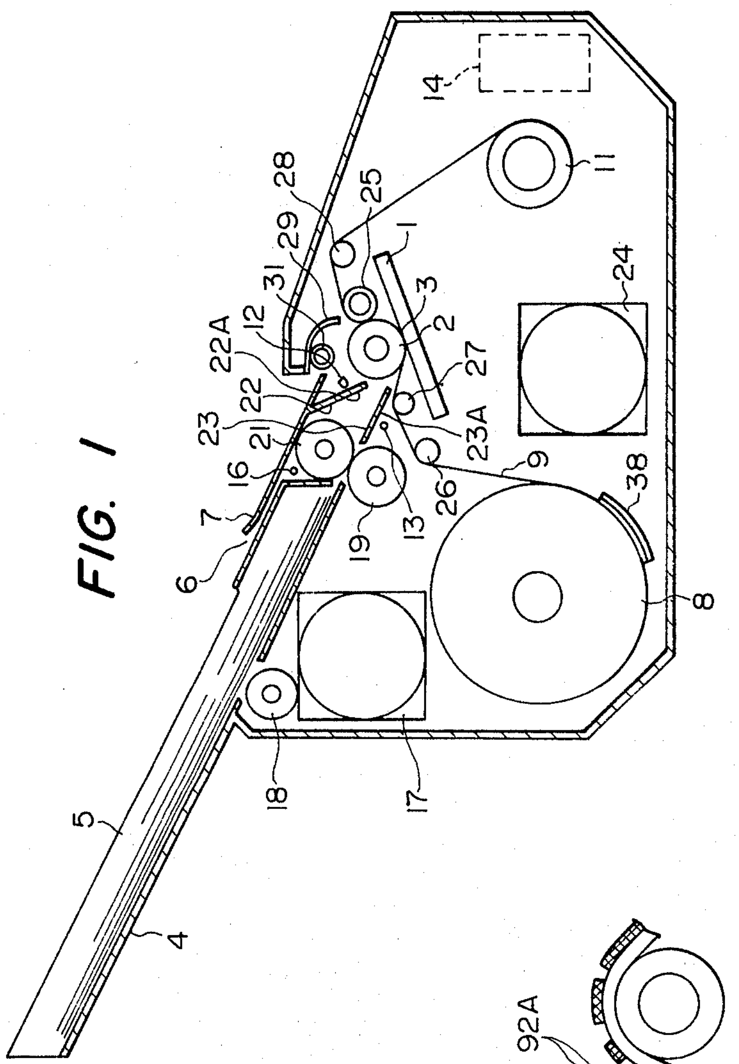
FIG. 1 is a side view of the printer according to the present invention.

FIG. 1 illustrates essential parts of the printer according to this invention. The printer is comprised of a recording section 3 for carrying out heat transfer recording at a position where a terminal head 1 and a back roll 2 come into contact, a travelling mechanism for delivering the recording paper 5 piled on a cassette 4, or paper fed manually from a manual paper feeding port 6, into a catch tray 7 through said recording section 3, a travelling mechanism for delivering a heat recording medium 9 from a feed roll 8 through said recording section 3 to recover in a take-up roll 11, a photo-producing element 12 and a photo-receiving element 13 detecting the recording paper in front of said recording section 3, a control circuit 14 controlling the operation of both of said travelling mechanisms upon detection of the recording paper, and other parts.

The feeding of the recording paper to the recording section 3 will first be described, and is similar to that described in the above-cited application Ser. No. 312,022. It is assumed that a starting button (not shown) for commencement of the recording operation is pushed while no recording paper is inserted into the manual paper feeding port 6. At this time, a sensor 16 consisting of a microswitch, for example, does not detect any manually inserted recording paper, and the control circuit 14 therefore operates an automatic paper feed. Thus, the control circuit 14 rotates the first motor 17 which causes rotation of a paper delivery roll 18 contacting the lowest layer of the recording paper 5 piled in the cassette 4 and also rotates a paper feed roll 19 disposed near the outlet of the cassette 4, both being rotated in a clockwise direction. At this time, a retard roll 21 contacting the paper feed roll 19 does not follow the clockwise rotation of the paper feed roll 19 due to operation of one-way clutch (not shown) but instead remains substantially stationary. Accordingly, even when a plurality of recording papers have been delivered at one time by the paper delivery roll 18, the retard roll will block the upper sheets and the recording paper will be delivered sheet by sheet from between the paper feed roll 19 and the retard roll 21 owing to the function of the retard roll 22.

The recording paper thus delivered advances, being guided by guide plates 22, 23, and joins with the heat recording medium 9 near the back roll 2. Both are conveyed to the recording section 3 with the recording paper being held between the peripheral surface of the back roll 2 and the heat recording medium 9.

On the other hand, when it is desired to use a recording paper having a different size from that of the rated recording paper in the cassette 4, such as exceedingly long recording paper or envelopes, or post cards, the operator inserts the recording paper through the manual paper feeding inlet 6 and pushes the start button. In this case, the sensor 16 for manual operation detects the existence of the recording paper, so that the control circuit 14 starts the operation of the manual paper feeding. Thus, the control circuit 14 rotates the paper feed roll 19 in a counterclockwise direction while stopping the rotation of the paper delivery roll 18. The retard roll 21 follows the rotation of the paper feed roll 19 when the latter rotates in this direction, and the retard roll 21 therefore rotates in a clockwise direction. The retard roll 21 contacts the lower surface of the catch tray 7 disposed thereabove with a predetermined pressure, and feeds the recording paper forwardly with its rotation. The recording paper thus delivered forwardly advances, being guided by the guide plates 22, 23, and is conveyed to the recording section 3 after joining with the heat recording medium 9.

The position detecting mechanism is similar to that described in the above-cited application Ser. No. 312,021. In the pair of the guide plates 22, 23, holes 22A, 23A are formed at optional positions where the conveying times of the recording paper from either source to the recording section 3 becomes respectively equal, and a photo-producing element 12 and a photo-receiving element 13 are arranged face to face on a line connecting these holes. Accordingly, when the recording paper is delivered from the cassette 4, or through the manual paper feed port 6, and the leading edge of the recording paper reaches a position at which the light ray emitted by the photo-producing element 12 is interrupted, the photo-receiving element 13 detects the leading edge of the recording paper. The control circuit mentioned above starts counting time from this moment, and rotates the second drive motor 24 at a later time when the leading edge of the paper and the heat recording medium 9 join together. Consequently the take-up roll 11 and a drive roll 25 are driven, and the heat recording medium 9, passed around stress absorbing roll 26, guide roll 27, back roll 2, drive roll 25 and guide 28, commences to travel. As a result, after the heat transfer recording of the recording paper is carried out at the recording section 3, the recording paper is conveyed up to the contact point of the back roll 2 and the drive roll 25.

The heat recording medium 9 changes its direction abruptly along the periphery of the drive roll 25 at a time point at which it has passed said contact point. The recording paper being unable to follow the heat recording medium 9, is peeled off therefrom. Since the tip end of the guide 29 is disposed close to the periphery of the drive roll 25, transfer of the recording paper in the direction of guide roll 28 is prevented even if the peeling is affected only at the leading edge of the recording paper, whereby the recording paper can be positively separated from the heat recording medium 9. The recording paper thus separated from the heat recording medium 9 is guided by a guide 29 and is discharged outside of the apparatus by a discharging feed roll 31 contacting therewith, and is received in the catch tray 7.

On the other hand, the photo-receiving element 13 detects the rear end of the recording paper at a time slightly before the rear end of the recording paper reaches the recording section 3. At this stage, the control circuit 14 stops the rotation of the first drive motor 17. After a preset time has passed and at a time point where the rear end of the recording paper has been peeled from the heat recording medium 9, the control circuit stops the travelling of the heat recording medium 9. In the case where recording is to be effected continuously, a signal for commencement of automatic feed of the recording paper can be generated in accordance with the detection signal at the rear end of each sheet of recording paper.

Figure 2:
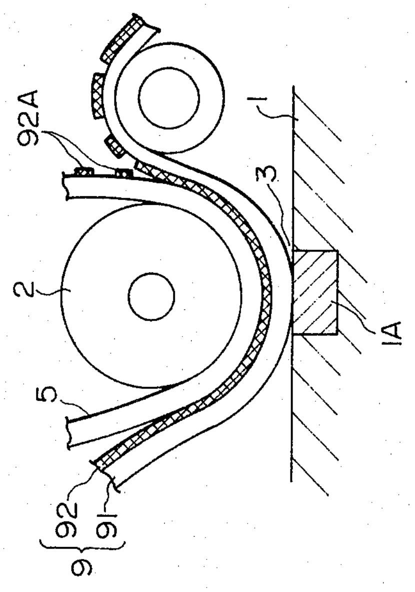
FIG. 2 is an enlarged view for explaining the recording section.

In this printer, as shown in FIG. 2, the recording paper 5 and the heat recording medium 9, in which a heat-sensitive solid ink layer 92 has been formed on the base paper 91, are overlapped near the recording section in such a manner that the solid ink layer 92 comes in contact with the recording paper, and heat is supplied to the heat recording medium 9 selectively in accordance with picture information from a heat-generating resitor 1A of the thermal heat 1. Thus, the ink 92A melted or sublimated is transferred onto the recording paper 5, while the ink 92B maintained in a solid state is caused to remain on the heat recording medium 9.

In the recording section 3, in order to carry out the heat transfer recording efficiently, the back roll 2 is pressed against the heat-generating resistor 1A through the recording paper 5 and heat recording medium 9. Accordingly, if pressing is effected in a state that waving is produced in the recording medium 9, wrinkles are produced on the heat recording medium in the recording section 3 and it may not be possible to obtain a satisfactory heat transfer recording. Since the thickness of the heat recording medium 9 is usually 20 microns or less, stress applied in the width direction of the heat recording medium 9 becomes non-uniform if there is a positional error in the travelling system, and this increases the possibility of forming wrinkles.

The stress absorbing roll 26 and a brake mechanism shown in FIG. 1 are mechanisms for preventing the formation of the wrinkles. In the stress absorbing roll 26, as described more fully in the above-cited application Ser. No. 312,020, the inclination of the roll contacting with the heat recording medium 9 is made variable, whereby the non-uniform stress can be absorbed. In the brake mechanism 38, a tension is applied on the heat recording medium 9 by restraining the rotation of the feed roll 8, thus helping to prevent the generation of waving and wrinkles on the heat recording medium 9.

In this printer, the diameters of the feed roll and the take-up roll are successively varied with the use of the heat recording medium 9. In order to keep the take-up speed of the take-up roll 11 constant notwithstanding these diameter changes, the take-up roll 11 is driven through a slip clutch (not shown) whereby the rotating speed thereof reduces in accordance with the increase in its diameter. In addition, a belt (not shown) is passed through the back roll 2 and the discharge feed roll 31, so that the driving mechanism is more simplified than a conventional apparatus where the discharge feed roll 31 is driven through a separate driving source.

Assuming that the printer described above utilizes a heat-generating element having an applied power of 0.64 W, and 8 dots/mm, and the recording time of 1 line scanning is set to 2.6 ms, it is possible to obtain a recording (reflection) density of 1.4 or more, which corresponds to a recording of 10 sheets in 1 minute with A4 JIS with a scanning of 7.7 dots/mm.

As described above, in the printer according to the present invention, the recording paper and the heat recording medium are made to travel by respective travelling mechanisms, as described in the above cited-application Ser. No. 312,020, thereby heat transfer recording can be carried out simply with any paper including manually feed paper. Furthermore, since means for detecting the position of the recording paper is provided and the operational sequence of the two sets of independent travelling mechanisms are controlled, it is possible to transport the sheet-formed heat recording medium 9 only when recording is required, which reduces the expense considerably.

In addition, in the printer of this invention, since video signals are used as inputs, it can be used as a printer for the output of a word processor through an interface circuit, a printer for a facsimile device, or a printer for hard copy on CRT display apparatus. Furthermore, it can of course be used as a simple copying machine if combined with a reading device.

What is claimed is:

1. In a thermosensitive image recording device of the type wherein an ink donor sheet having heat sensitive ink on one surface thereof is selectively heated in accordance with picture information at a recording station to melt and transfer selected portions of said ink to a recording paper in contact with said one surface of said ink donor sheet, said recording device comprising:

a source of recording paper;

a first transport mechanism for transporting said recording paper from said source through a first path which passes through said recording station;

a source of ink donor sheet;

a second transport mechanism for transporting said ink donor sheet from said donor sheet source through a second path which passes through said recording station, said first and second paths being different from one another but coinciding in the same direction of movement at least at said recording station;

means for detecting said recording paper at a predetermined position in said first path prior to said recording station; and control means for operating said first and second transport mechanisms in accordance with said detection.

2. A thermosensitive image recording device as defined in claim 2, further comprising a stress absorbing roller disposed in said second path and in contact with said donor sheet between said donor sheet source and said recording station, said stress absorbing roller having an axis of rotation which has an inclination variable in a direction perpendicular to said donor sheet.

3. A thermosensitive image recording device as defined in claim 1 or 2, wherein said donor sheet source comprises a roller on which said donor sheet is wound, said recording device further comprising braking means for hindering rotation of said donor source roller to thereby increase tension in said donor sheet and reduce wrinkles therein.

4. A thermosensitive image recording device as claimed in claim 1, wherein said second transport mechanism includes a donor guide member for abruptly changing the direction of said second path after said recording station, said recording device further comprising a separator guide member close to said one surface of said donor sheet in the vicinity of said donor guide member for engaging the leading edge of said recording paper to prevent said recording paper from following said second path.

5. A thermosensitive image recording device as defined in claim 1, wherein said recording paper source includes an automatic feed paper reservoir and a manual feed port, and wherein said first transport mechanism comprises sensing means for sensing when a paper is inserted into said manual feed port and a drive mechanism for feeding paper from said reservoir when no paper is sensed at said manual feed port and feeding paper from said manual feed port in response to the detection of paper by said sensing means.

6. A thermosensitive image recording device as defined in claim 1, wherein said control means maintains said second transport mechanism disabled until a first predetermined period of time after a leading edge of said recording paper has been detected by said means for detecting, and again disables said second transport mechanism a second predetermined time after a trailing edge of said recording paper has been detected by said means for detecting.

* * * * *